United States Patent

Rosenthal et al.

[11] 4,000,412
[45] Dec. 28, 1976

[54] VOLTAGE AMPLITUDE MULTIPLYING CIRCUITS

[75] Inventors: Bruce David Rosenthal, Highland Park; Andrew Gordon Francis Dingwall, Somerville, both of N.J.

[73] Assignee: RCA Corporation, New York, N.Y.

[22] Filed: May 19, 1975

[21] Appl. No.: 578,913

[30] Foreign Application Priority Data

June 5, 1974 United Kingdom ............ 24898/74

[52] U.S. Cl. .................. 307/208; 307/110; 307/246; 307/264; 307/296 A; 307/DIG. 1
[51] Int. Cl.² .................. H03K 3/64; H03K 3/353; H03K 17/60
[58] Field of Search ......... 307/108, 109, 110, 246, 307/264, 269, 296 R, 296 A, 279, 208, DIG. 1, 240, 251; 320/1

[56] References Cited

UNITED STATES PATENTS

| 3,509,375 | 4/1970 | Gormley | 307/246 X |
| 3,790,812 | 2/1974 | Fry | 307/246 X |
| 3,900,746 | 8/1975 | Kraft et al. | 307/264 |

Primary Examiner—John S. Heyman
Assistant Examiner—Larry N. Anagnos
Attorney, Agent, or Firm—H. Christoffersen; Henry I. Schanzer

[57] ABSTRACT

Circuits for generating pulsating potentials and voltage levels outside the range of, and/or of greater magnitude than, the operating potential applied to the circuits. Each circuit includes first and second transistors for applying a first voltage to one plate of a capacitor and a second voltage to the other plate of the capacitor, during one time interval. During a subsequent time interval, the first and second transistors are turned off and a third transistor applies the second potential to the one plate of the capacitor. The change in the potential at the one plate of the capacitor is coupled to the other plate of the capacitor at which is produced an output potential outside the range of the first and second voltages. The potential difference between the first voltage and the output potential is greater in amplitude than the potential difference between the first and second voltages. The circuit may also include means alternately applying the first voltage and then the output potential to an output point for generating pulsating signals of greater amplitude than the magnitude of the applied potential. The outputs of two or more circuits may be combined to produce direct current (d.c.) levels. Also included are circuits which operate from a pulsating source of operating potential.

22 Claims, 9 Drawing Figures

VOLTAGE AMPLITUDE MULTIPLYING CIRCUITS

This invention relates to voltage multiplying circuits and to circuits operated by the multiplied voltages.

In many applications, the available power supply potential is too low to operate some circuits or other utilization equipment. Accordingly, there is a need for voltage multiplying circuits for producing voltages of greater magnitude than those available from the main power supply. Voltage multiplying circuits are known; one is shown, for example, in U.S. Pat. No. 3,790,812, entitled "Device for Generating A High Voltage Supply", issued Feb. 5, 1974, to P. W. Fry. These circuits include a capacitor which is charged during one time interval by means of a first element connecting one plate of the capacitor to a first potential (e.g. +V volts) and a second element connecting the other plate of the capacitor to a second potential (e.g. −V volts). Voltage amplification is achieved, for example, by applying the second potential to the one plate of the capacitor and generating an enhanced potential at the other plate of the capacitor which is outside the range of the power supply potential. Normally, the first element is a transistor while the second element is a unidirectionally conducting element such as a diode or a transistor connected like a diode. The unidirectionally conducting element provides a relatively low impedance path during the charging cycle of the capacitor. The second element need be a unidirectionally conducting element to prevent the enhanced potential produced at the other plate from being clamped through a low impedance path to the second potential during the voltage amplifying portion of the cycle. This enables the generation of the enhanced potential at the second plate of the capacitor.

A problem with this type of circuit is the existence of a threshold voltage offset ($V_T$ or $V_{BE}$) across the unidirectional element (e.g. diode or the diode connected transistor). As a result, the other plate of the capacitor is not placed at the second potential. Rather, it is offset with respect to the second potential by the offset voltage ($V_T$ or $V_{BE}$) of the second element. The enhanced output potential produced at the other plate of the capacitor is thus reduced by the threshold voltage offset. The threshold voltage offset of the unidirectional element prevents the full swing of potential to be developed at the other plate of the capacitor. Where, for example, the offset voltage is in the order of one volt and the power supply voltage is in the order of 1.5 volts, the circuit can, at most, produce an enhanced voltage of one-half volt instead of the theoretically possible 1.5 volts. Many stages are then required to produce significant voltage amplification.

Another problem with using a transistor connected as a diode between a plate of the capacitor and a point of potential occurs as follows. When the capacitor charges up, the potential applied between the control electrode and the source or emitter of the transistor decreases and the effective impedance of the diode connected transistor increases. As a result, a longer period of time is required to fully charge the plate of the capacitor to the point of potential.

In circuits embodying the invention transistors are used to connect the plates of a capacitor to first and second points of potential and clamp the plates to substantially the full potential at those points.

In some of the embodiments, one side of the capacitor is connected by means of the conduction path of a first transistor to a first terminal and by means of the conduction path of a second transistor to a second terminal. The conduction path of a third transistor is connected between the other side of the capacitor and the second terminal and the conduction path of a fourth transistor is connected between the other side of the capacitor and the control electrode of the third transistor.

In another embodiment, one side of a capacitor is connected by means of the conduction path of a first transistor to a first terminal and by means of the conduction path of a second transistor to a second terminal. The conduction path of a third transistor is connected between the other side of the capacitor and the first terminal. Means are connected to the control electrodes of said first, second and third transistors for turning on said second transistor, overdriving said third transistor into conduction, and turning off said first transistor during one time interval. During a subsequent time interval the first transistor is turned on and the second and third transistors are turned off.

In the accompanying drawings like reference characters denote like components and FIG. 1 is a schematic diagram of a voltage multiplying circuit embodying the invention;

Figure 1:
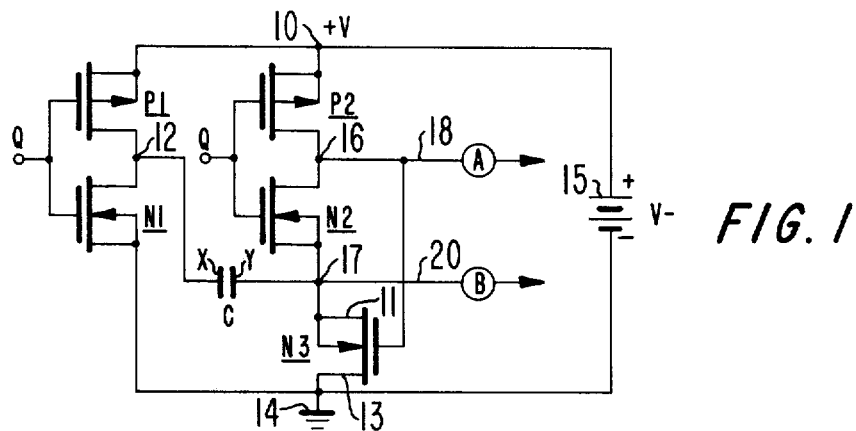

The transistors used to illustrate the invention are insulated-gate field-effect transistors (IGFETs) of the enhancement type formed in bulk silicon. But, bipolar transistors, depletion type transistors, or transistors formed on an insulator substrate could be used instead. The transistors of P-conductivity type are formed in an N-substrate. They are identified by the letter P and a reference numeral, and are shown in the drawings either with an arrow on their substrate connection pointing away from the body of the transistor, or an arrow on their source electrode pointing towards the body of the transistor. The transistors of N conductivity are formed in P-wells diffused in the N-substrate. They are identified by the letter N and a reference numeral, and are shown in the drawings either with an arrow on their substrate connection pointing towards the body of the transistor, or an arrow on their source pointing away from the transistor. In general, the substrate of a P-conductivity type transistor should be connected to the most positive potential applied to the source or drain of the transistor and the substrate of an N-conductivity type transistor should be connected to the most negative potential applied to the source or drain of the transistor.

Transistor characteristics are well known and need not be described in detail. But, for a clearer understanding of the description to follow, the following definitions and characteristics pertinent to the invention are set forth:

1. The IGFETs used have a first electrode and a second electrode which define the ends of a conduction path and a control electrode (gate) whose applied potential determines the conductivity of the conduction path. The first and second electrodes of an IGFET are referred to as the source and drain electrodes. For a P-type IGFET the source electrode is defined as that electrode of the first and second electrodes having the highest potential applied thereto. For an N-type IGFET, the source electrode is defined as that electrode of the first and second electrodes having the lowest potential applied thereto.

2. For conduction to occur, the applied gate-to-source potential ($V_{GS}$) must be in a direction to forward bias the gate with respect to the source and must be greater in magnitude than a given value which is defined as the threshold voltage ($V_T$) of the transistor.

3. IGFETs used are bidirectional in the sense that when an enabling signal is applied to the control electrode, current can flow in either direction in the conduction path defined by the first and second electrodes.

4. An IGFET may be made to conduct unidirectionally by connecting its gate to its drain. The IGFET then conducts like a diode, passing current for one polarity of gate-to-source potential and blocking current for the opposite polarity of potential. But the minimum source-to-drain voltage of an IGFET connected as a diode is equal to the $V_T$ of the transistor. This is also true of an IGFET when normally operated as a source-follower. In contrast, when operated in the common source mode, the IGFET has relatively low "on" impedance between its source and drain. Current flow through the IGFET produces a voltage drop between the source and drain. But, for negligible drain-to-source current there is substantially no voltage drop and hence no offset between the drain and source.

The circuit of FIG. 1 includes a complementary inverter comprised of transistors P1 and N1. Transistor P1 is connected at its source and substrate to terminal 10 and at its drain to terminal 12. Transistor N1 is connected at its drain to terminal 12 and at its source and substrate to terminal 14. Transistor P2 is connected at its source and substrate to terminal 10 and at its drain to terminal 16 at which is produced an output signal identified as "A". Transistor N2 is connected at its drain to terminal 16 and at its source and substrate to terminal 17 at which is produced an output signal identified as "B". Conductors 18 and 20 are connected to terminals 16 and 17, respectively. Electrodes 11 and 13 define the ends of the conduction path of transistor N3. Electrode 11 and the substrate of transistor N3 are connected to terminal 17, electrode 13 is connected to terminal 14 and the gate of transistor N3 is connected to terminal 16.

A capacitor C is connected between terminals 12 and 17. The value of the capacitor is dependent on the amount of charge it is necessary to apply to utilization circuits (not shown) connected to terminals 16 and 17 by means of conductors 18 and 20, respectively. The capacitor may be an integrated, on chip, component or a discrete, off chip, component. In the discussion to follow, the terminal, side, or plate of capacitor C connected to terminal 12 will be referred to as plate X or "X" and the terminal side, or plate connected to terminal 17 will be referred to as plate Y or "Y".

Figure 2:
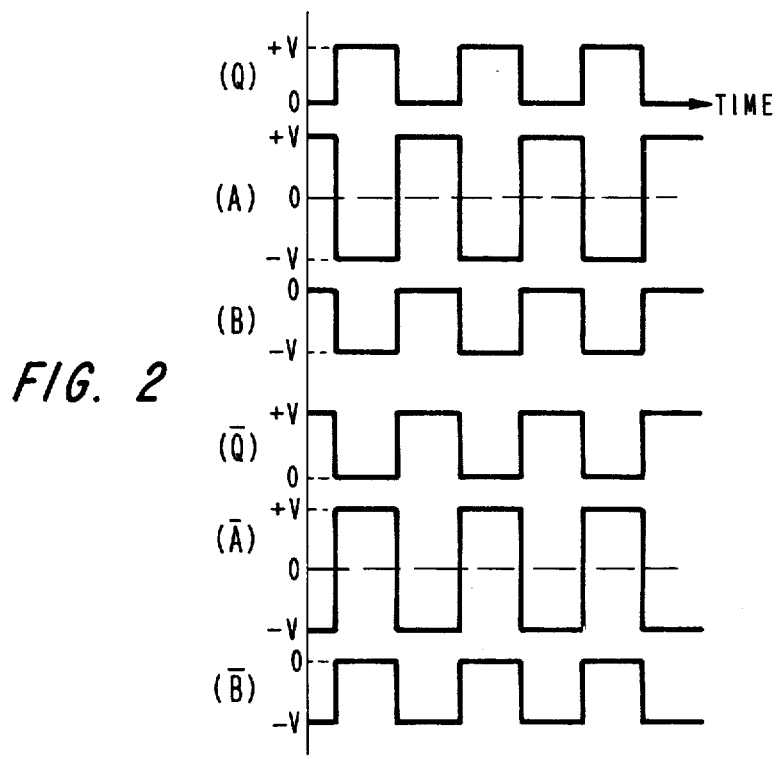
FIG. 2 is a diagram of waveforms at various inputs and outputs of the circuits of FIGS. 1 and 4.

A power supply 15 having a magnitude of V volts is connected at its positive terminal (+V volts) to terminal 10 and at its negative terminal (ground) to ground terminal 14. For the circuit to function, V volts must exceed the threshold voltages of the transistors used in the circuit. An input signal, Q, is applied to the gate electrodes of transistors P1, N1, P2 and N2. The signal Q, as shown in FIG. 2, varies in value between +V volts and ground, and may be a repetitive clock signal or an aperiodic pulse or pulse train.

In the operation of the circuit of FIG. 1 when the signal Q goes low (to ground) transistors N1 and N2 are turned off and transistors P1 and P2 are turned on. When transistor P1 is turned on, the potential at terminal 12 and plate X of capacitor C charges up to +V volts through the low on impedance of transistor P1. When transistor P2 is turned on, +V volts is applied to terminal 16 and to the gate of transistor N3. Transistor N3 is fully on and conducts conventional current from terminal 17 to terminal 14 with electrode 11 functioning as the drain and electrode 13 functioning as the source. Thus, transistor N3 clamps terminal 17 and plate Y of capacitor C to ground. Capacitor C charges to the full V volts through transistor P1 and N3, with plate X at +V volts. Transistors P1 and N3 are operated in the common source mode. In this mode of operation the transistors behave like extremely low impedance switches with no threshold voltage offsets. If, for example, transistors P1 and N3 are turned on for a period of time T greater than three time constants ($\tau$), where $\tau$ is equal to the product of C and the sum of the "on" impedances of transistors P1 and N3, then capacitor C is charged to at least 96% of V volts. By selecting the period T to be greater than $5\tau$ it may be assumed that C is charged to the full value of the power supply potential.

When the signal Q goes high (to +V volts), transistors P1 and P2 are turned off and transistors N1 and N2 are turned on. The turn off of transistor P2 removes the turn on potential to the gate of transistor N3. The turn off of transistors P1 and N3 isolates plates X and Y of C from power supply terminals 10 and 14, respectively. When transistor N1 turns on, plate X of capacitor C which was charged to +V volts is clamped and discharged to ground through the low impedance conduction path of transistor N1. This is equivalent to applying a negative voltage step of V volts amplitude to plate X. Since the potential across a capacitor cannot change instantaneously, the potential at Y of capacitor C goes negative by V volts. The potential at Y and terminal 17, which was initially at zero volts, goes from zero volts to -V volts as shown in waveform B of FIG. 2.

Transistor N2 with +V volts applied to its gate and -V volts applied to its source electrode, is turned on hard and conducts in the common source mode, clamping terminal 16 to terminal 17 and causing the potential at terminal 16 to go from +V volts to -V volts. This -V volts signal coupled to terminal 16 is applied to the gate of transistor N3 keeping it off or, if on, turning it off.

When Q goes high, electrode 11 of transistor N3 goes to -V volts while electrode 13 is at ground potential. Electrode 11 now functions as the source and electrode 13 as the drain of transistor N3. If the potential at the gate of transistor 13 were positive with respect to -V volts, it would conduct conventional current from terminal 14 to terminal 17 preventing the potential at terminal 17 from going to −V volts. Transistor N2, when on, functions as a low impedance connection between the gate and source (11) of transistor N3 and keeps it turned off. Also, transistor N2 couples the −V volts generated at terminal 17 to terminal 16, causing the potential at the latter and at the gate of transistor N3 to go to −V volts.

The turn on and turn off of transistor N3 by means of transistors P2 and N2 is of great importance. Transistor P2, when on, provides a turn on signal for N3 and also establishes a +V volt level on conductor 18. Transistor N3, when turned on, conducts in the common source mode and provides an excellent clamp between ground and plate Y. The ability to establish ground potential at plate Y, during the charging period, enables the negative potential subsequently produced at Y to be substantially equal to −V volts when terminal X is switched from +V volts to ground. That is, there is no positive voltage residual at Y to substract from the −V volts step coupled through the capacitor. The problem of turning off the inherently bilateral switch N3 when the potential at its electrode 11 goes negative is solved by use of transistor N2. With transistor N3 turned off, the potential at Y may go to −V volts and the potential between terminals 10 and 17 is 2V volts which is twice the amplitude of power supply 15. Thus, when P1 and P2 turn off and N1 and N2 turn on, the potential (B) at terminal 17 goes from zero volts to −V volts and the potential at terminal 16 goes from +V volts to −V volts. The amplitude of the signal A is, therefore, approximately 2V volts as shown in FIG. 2.

The transistors of the circuit, when conducting, conduct in the common source mode and thus function, as nearly as possible, as ideal switches.

Connecting the substrate of transistor N3 to terminal 17 ensures proper operation of the circuit. When transistor N3 is conducting the potential at terminal 17 never is less positive than that at terminal 14. The P-substrate and the region corresponding to electrode 13 form a forward biased parasitic diode. But, since this diode is in parallel with the conduction path of transistor N3 it aids in conducting the charging current of capacitor C. When transistor N3 is turned off and the potential at 17 goes negative it is important that the substrate of N3 be connected to electrode 11, now functioning as the source, to ensure that there are no conduction or leakage paths between terminals 14 and 17. If the substrate of N3 were connected to ground, the P-substrate-to-region 11 would form a parasitic diode conducting in the forward direction from terminal 14 to terminal 17 preventing the development of the full negative potential.

When Q goes "low" again, A goes to +V volts and turns on transistor N3, transistors P1 and P2 are turned on, transistors N1 and N2 are turned off, and capacitor C charges, as described above, to restore any charge that may have leaked off.

It has thus been shown that a pulsating signal B is generated having the same amplitude as the power supply, but having a voltage range which lies outside the range of the power supply. In effect, the charging signal (+V volts) present at X when discharged to round results in a negative step (−V volts) which is coupled through the capacitor C and which is level shifted with respect to the direct current (d.c.) level (ground) at Y to produce a potential level (−V volts) which exceeds the range of the power supply. It has also been shown that a pulsating signal A is generated which has twice the amplitude of the power supply voltage.

Figure 3:
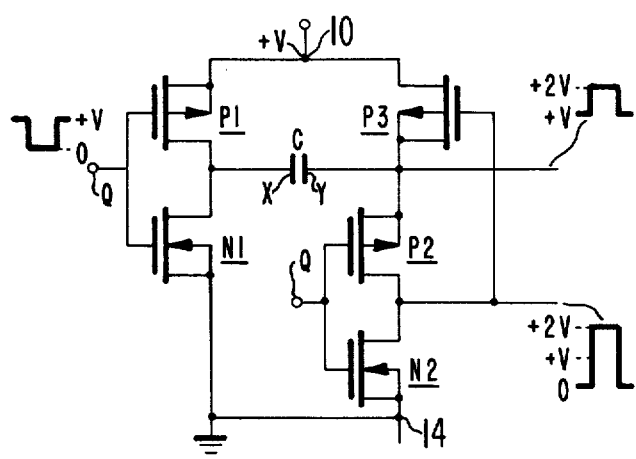
FIG. 3 is another schematic diagram of a circuit embodying the invention.

The circuit of FIG. 3 is the complement of the circuit of FIG. 1. In it, the P transistors of FIG. 1 have been replaced by N transistors, the N transistors by P transistors and the whole transistor arrangement being then inverted between terminals 10 and 14. In the circuit of FIG. 3, voltages more positive than the most positive power supply potential (+V) are produced. In contrast, thereto, in FIG. 1 voltages more negative than the most negative power supply potential (ground) were produced. In the circuit of FIG. 3, when Q goes high (+V) transistors N1 and N2 are turned on and when transistor N2 conducts, it turns on transistor P3. This causes plate X to be at ground, plate Y to be at +V volts and capacitor C to be charged to +V volts. When Q goes low, N1 and N2 turn off and P1 and P2 turn on. A positive voltage step of +V volts is applied to plate X. Since the potential across C cannot change instantaneously, the potential at Y goes from +V volts to +2V volts. Transistor P2 couples the 2V volts at plate Y to the gate of transistor P3 turning it off or keeping it turned off, and preventing the capacitor C from discharging into terminal 10. Thus, the potential at Y swings from V volts to 2V volts and the potential at the drains of P2 and N2 swings between 0 volts and +2V volts.

Figure 4:
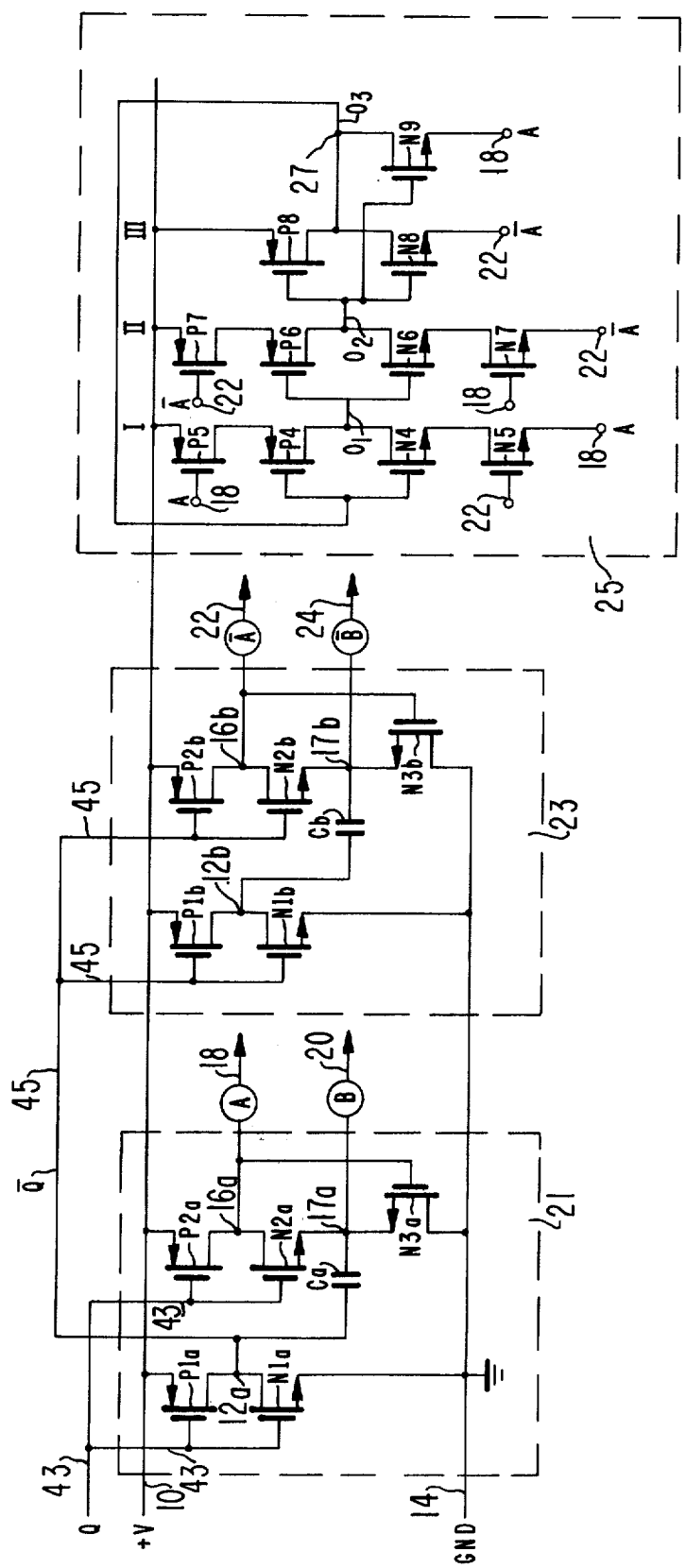
FIG. 4 is a schematic diagram of a circuit embodying the invention in which pulsating signals are produced and applied to a counter circuit.

The circuit of FIG. 4 includes two voltage multiplying sections 21 and 23 and a dynamic binary counter stage 25 which is operated by means of pulsating signals produced by sections 21 and 23. The structure of each one of sections 21 and 23 corresponds to the structure of FIG. 1. The elements and nodes of sections 21 and 23 corresponding to the elements and nodes of the circuit of FIG. 1 bear like reference numerals. With the addition of the characters $a$ and $b$ respectively, to their reference numerals. Output terminals 16a and 17a at which are produced outputs A and B, respectively, are connected to conductors 18 and 20. Outputs 16b and 17b at which are produced outputs $\overline{A}$ and $\overline{B}$, respectively, are connected to conductors 22 and 24.

The operation of the circuits in each one of section 21 and 23 is similar to the circuit shown in FIG. 1, described above, and need not be repeated in detail.

Clocking pulses Q are applied via conductor 43 to the gates of transistors P1a, N1a, P2a, and N2a. Clock pulses $\overline{Q}$, the complement of Q, are produced at the drains of transistors P1a and N1a. They are applied via conductor 45, connected to terminal 12a, to the gates of transistors P1b, N1b, P2b and N2b. However, it should be appreciated that Q and $\overline{Q}$ could be produced by independent means. In response to the variation in the clock pulse Q there is produced at output connections 18 and 20 signals A and B respectively. In response to the clock pulse $\overline{Q}$, there is produced at output connections 22 and 24 signals $\overline{A}$ and $\overline{B}$, respectively, which are the complements of signals A and B. The waveforms of these signals are illustrated in FIG. 2.

The binary counter section 25 includes 3 groups or strings of transistors denoted by roman numerals I, II and III.

In the first string (I), the conduction paths of transistors P5, P4, N4 and N5 are connected in series and in the second string (II), the conduction paths of transistors P7, P6, N6 and N7 are connected in series. Transistors P5 and P7 are connected at their source electrodes to conductor 10. The drains of transistors P4 and N4, which define the output $O_1$ of string I, are connected to the gates of transistors P6 and N6. The gates of transistors P5 and N7 and the source of transistor N5 are connected to conductor 18 to which is applied the signal A. The gates of transistors P7 and N5 and the source of transistor N7 are connected to conductor 22 to which is applied the signal $\overline{A}$.

In the third string (III), transistor P8 has its conduction path connected between terminals 10 and 27. Transistor N8 has its conduction path connected between terminal 27 and conductor 22 and transistor N9 has its conduction path connected between terminal 27 and conductor 18. The drains of transistors P6 and N6, which define the output ($O_2$) of the second string, are connected to the gates of transistors P8, N8 and N9. Terminal 27 at which is produced the output ($O_3$) of the third group of transistors is connected to the gates of transistors P4 and N4. Transistors P8, N8, and N9 form a quasi static complementary inverter, as described below.

The operation of the circuit of FIG. 4 as a binary counter is as follows:

When $A=+V$ and $\overline{A}=-V$: (a) the string I of transistors is non-conductive (transistors P5 and N5 are cut off and output $O_1$ retains its former value regardless of the value of its input ($O_3$); (b) the string II of transistors is conductive and produces at its output ($O_2$) the inverse of the signal ($O_1$) present at its input; (c) the group III of transistors always functions as a complementary inverter. Either $\overline{A}$ is low in which case transistors P8 and N8 form a complementary inverter (transistor N9 is reverse biased since A is high) or A is low in which case transistors P8 and N9 form a complementary inverter (transistor N8 is reverse biased since $\overline{A}$ is high).

When $A=-V$ and $\overline{A}=+V$: (a) the string I of transistors is conductive. Transistors P5 and N5 are switched on and transistors P4 and N4 produce at their drains an output signal $O_1$ which is the inverse of the signal $O_3$ applied to their gates; (b) the string II of transistors is non-conductive since transistors P7 and N7 are switched off. The output signal $O_2$ remains set at its previous level; (c) the group III of transistors P8 and N9 functions as an inverter. Transistor N8 with $\overline{A}=+V$ volts applied to its source remains cut off regardless of the signal ($-V$ or $+V$) applied to its gate.

1. Assume now that $O_1$ is initially at $+V$ volts and that $A=+V$ (high) and $\overline{A}=-V$ (low). In string I, transistors P5 and N5 are cut off and $O_1$ remains high regardless of the value of $O_3$. In string II, transistors P7 and N7 are switched on. $O_1$ high causes transistor P6 to be cut off and transistor N6 to be turned on. This causes $O_2$ to go to $-V$ volts by conduction through transistors N6 and N7. With $O_2$ at $-V$ volts, transistor P8 is turned on and transistor N8 is turned off. As mentioned above, transistor N9 with $+V$ volts applied to its source is turned off regardless of the signal at $O_2$. With transistor P8 turned on, $+V$ volts is supplied to terminal 27 and the signal $O_3$ goes high.

2. Assume now that A goes to $-V$ volts (low) and that $\overline{A}$ goes to $+V$ volts (high).

In string I, transistors P5 and N5 are turned on. With $O_3$ high applied to the gates of transistors P4 and N4, transistor P4 is cut off and transistor N4 is turned on. This causes the signal $O_1$ to go to $-V$ volts by means of conduction through transistors N4 and N5 to conductor 18. The change of the signal $O_1$ from high to low does not alter the signal $O_2$ since in string II transistors P7 and N7 are cut off and the transistors of string II are nonconductive. With $O_2$ remaining at its previous level, the signal $O_3$ remains high.

3. Assume now that A returns to $+V$ volts (high) and that $\overline{A}$ goes to $-V$ volts (low).

The transistors P5 and N5 in string I remain cut off and the signal $O_1$ remains low. Transistors P7 and N7 in string II are switched on. With $O_1$ low applied to the gates of transistors P6 and N6, transistor N6 is cut off and transistor P6 is turned on. This causes the signal $O_2$ to rise up to $+V$ volts. The $+V$ volts applied to the gates of transistors P8 and N8 turn on the latter and cut off the former. As a result, the potential at terminal 27 goes to $-V$ volts by means of the conduction path of transistor N8 to conductor 22. Thus, the signal $O_3$ goes low.

4. Assume now that A makes a transition to $-V$ volts (low) and that $\overline{A}$ makes a transition to $+V$ volts (high). With $O_3$ low, the signal $O_1$ goes high while the signal $O_2$ remains at the level to which it was set prior to the transition of A from low to high and the signal $O_3$ remains low. The signal levels present at terminals $O_1$, $O_2$ and $O_3$ now correspond to the signal levels in the circuit in paragraph number one above. Therefore, the original conditions discussed above have been restored to the circuit.

It should be evident from the discussion above that the signal $O_1$, $O_2$ and $O_3$ change state once for every two transitions of the signals A and $\overline{A}$. Therefore, the circuit effectively functions to divide the clock frequency (A and $\overline{A}$) by a factor of 2. Any one of the signal levels $O_1$, $O_2$ and $O_3$, but preferably $O_3$, can then be connected to a subsequent stage identical in structure to the circuit shown in section 25 or in the alternative to a different circuit which can further count down the clock frequency.

It is important to note that the pulse voltage signals A and its inverse $\overline{A}$ may be used to simulate a continuous supply. For example, in the third string of the counter stage a quasi static inverter is formed by connecting two N channel transistors (N8, N9) to the pulsating supplies. The two transistors having their gates connected in common to a single point are equivalent functionally to a single transistor connected to a direct current (d.c.) power supply. The counter stage 25 does not require a continuous negative power supply. However, a continuous negative power supply could have been supplied by connecting a transistor (not shown) between the drain of transistor N5 and conductor 22 and between the drain of transistor N7 and conductor 18 and by applying to the gates of these transistors the complement of the signal applied to their sources.

It should be appreciated that the counter stage shows that certain circuits may be produced which may be operated from pulsating supplies. It should also be appreciated that circuits may be operated from a pulsating power supply and by means of additional transistors may function as if they were operated from a steady d.c. power supply.

It should also be appreciated that in the circuit of FIG. 4 the power supply potential $+V$ has been used to produce complementary pulsating potentials whose amplitude exceeds that of the power supply voltage. The complementary potentials have sufficient amplitude to operate counting circuits which might not be operable at the lower power supply potential. Furthermore, it is the frequency of the complementary potentials which is divided down by the counting circuits.

Figure 5:
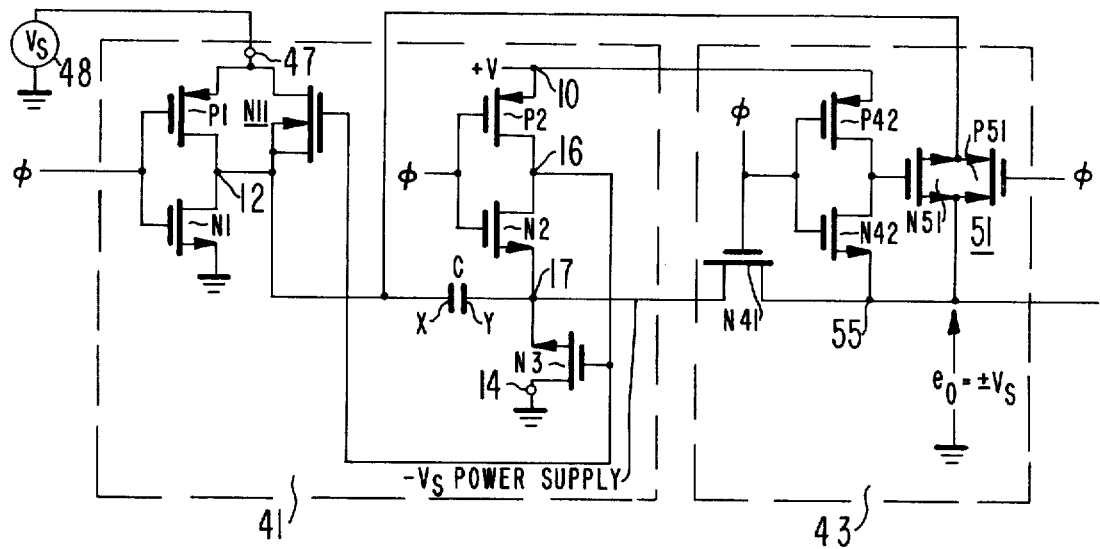
FIG. 5 is a schematic diagram of a circuit embodying the invention for producing positive or negative reference levels.

In the circuit of FIG. 5, there is provided a section 41 for producing an output signal ($-V_S$) which is approximately equal in amplitude but opposite in polarity to an input signal ($V_S$) applied to the circuit. The circuit also includes a section 43 for passing to an output 55 either $V_S$ or $-V_S$.

Section 41 is similar to the circuit of FIG. 1 except that: (1) the conduction path of transistor P1 is connected between a terminal 47 and terminal 12; (2) the conduction path of a transistor N11 is connected in parallel with the conduction path of transistor P1. The gate of transistor N11 is connected to terminal 16. Transistors N11 and P1 are designed to function, in part, as a complementary transistor transmission gate to ensure that the potential at terminal 47 is quickly coupled to terminal 12; and (3) a signal source 48 is connected to terminal 47 and applies thereto input signals, $V_S$, which are assumed to be positive with respect to ground potential.

Section 43 includes transistor N41, which functions as a transmission gate, having its conduction path connected between terminals 17 and 55. Transistors P42 and N42 form a complementary inverter. The sources of transistors P42 and N42 are connected to terminals 10 and 55, respectively, and the drains of transistors P42 and N42 are connected to the gate of a transistor N51. The conduction paths of transistors N51 and P51 are connected in parallel between terminals 12 and 55. Transistors P51 and N51 form complementary transmission gate 51. A control signal $\phi$ is applied to the gates of transistors P1, N1, P2, N2, N41, P42, N42 and P51. $\phi$ is a control signal which may be similar to Q, and as before, may be a clock signal or a control pulse which is selectively or periodically applied to the circuit.

When $\phi$ goes low (0 volts), transistors P1 and P2 are turned on. With transistor P2 on, the potential at terminal 16 goes to V volts and transistors N3 and N11 are turned on. With transistors P1 and N11 turned on, the signal $V_S$ is coupled through a low impedance path and charges capacitor C to $V_S$ volts, plate X being at $V_S$ volts, and plate Y being grounded through N3.

With $\phi$ low, transistor N41 is cut off decoupling terminal 55 from terminal 17. Transistor N42 is cut off while transistor P42 is on. With transistor P42 on, approximately +V volts are applied to the gate of transistor N51, turning it on. $\phi$ low turns on transistor P51 so that transmission gate 51 couples the $+V_S$ signal present at terminal 12 and X to output terminal 55. The output signal $e_o$ is, therefore, equal to $+V_S$.

When $\phi$ goes high (+V volts) transistors P1 and P2 are turned off and transistors N1 and N2 are turned on. The turn on of N1 causes the potential at X to change from $+V_S$ volts to zero volts through its low impedance conduction path. The negative going potential step ($+V_S$ to zero volts) present at X is coupled through the capacitor C causing the potential at Y and terminal 17 to go from zero volts to $-V_S$ volts. The $-V_S$ volts at terminal 17 are coupled through the conduction path of transistor N2 to the gates of transistors N3 and N11 turning them off. With $\phi$ high, transistor N41 is turned on and it couples the signal at terminals 17 to terminal 55 through its low impedance conduction path causing the signal at terminal 55 to go to $-V_S$ volts. The output signal $e_o$ is, therefore, equal to $-V_S$. $\phi$ high turns off transistors P42 and P51 and turns on transistor N42. With transistor N42 on, the low on impedance conduction path of transistor N42 holds the gate and source of transistor N51 at approximately the same potential ensuring the turn-off of transistor N51 and that transmission gate 51 is turned off.

Thus, when $\phi$ is low, $+V_S$ volts is coupled to output 55 and when $\phi$ is high a signal of same amplitude but of opposite polarity ($-V_S$), is produced at terminal 55.

FIG. 5 illustrates an application of the invention to a pulsed, precision, bilateral voltage reference ($+V_S$ and $-V_S$) which may be incorporated into an A/D converter. Capacitor C is charged from a precision positive-with-respect-to-ground voltage, $V_S$. Polarity selection of the output is controlled by the control signal ($\phi$) which results in: (1) continued charging of the capacitor when the positive reference is required and (2) switching the charged capacitor so its positive terminal (X) is grounded and its negative terminal Y assumes $-V_S$, when the negative reference is required. This application differs slightly from previous examples in that $-V_S$ (where $0<V_S<V$) is generated rather than $-V$ volts. It should be noted that $V_S$ could be an extremely low amplitude signal.

In FIG. 5 the logic circuits (P1, N1, P42, N42) and the transmission gates (N41, N51, P51) draw negligible current, and the $-V_S$ signal is not loaded.

Figure 6:
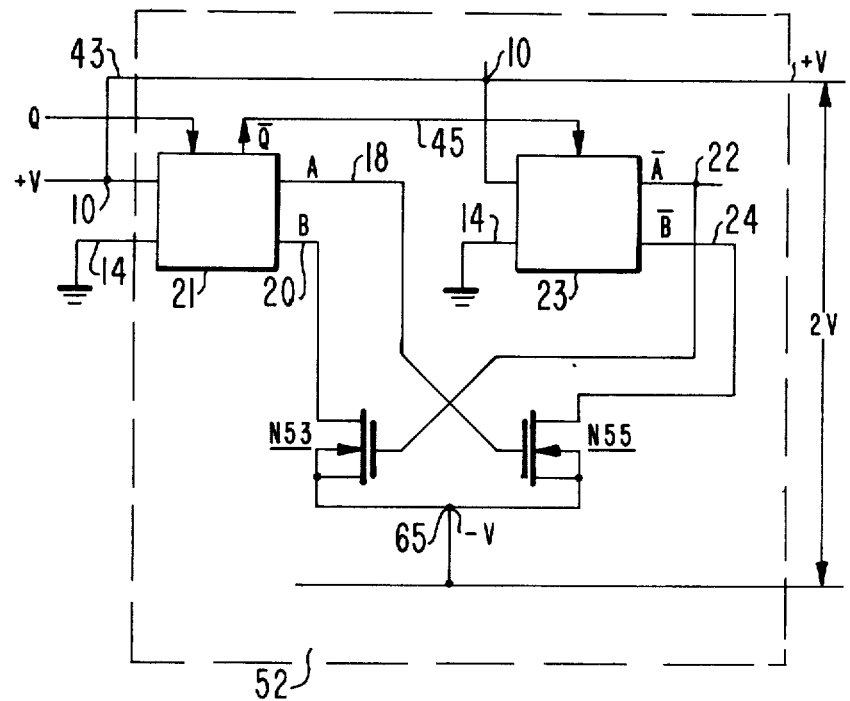
FIGS. 6 and 7 are partial block and schematic diagrams of voltage multiplying circuits embodying the invention producing direct current (d.c.) output levels.

In the circuit of FIG. 6 the pulsating signals B and $\overline{B}$ produced at the outputs of circuits 21 and 23 of FIG. 4 are combined to produce a direct current (D.C.) voltage level.

The circuit of FIG. 6 shown in box 52 includes boxes 21 and 23 which include circuits identical to those shown in the similarly labelled boxes in FIG. 4. The circuit also includes transistor N53 having its conduction path connected between conductor 20 and terminal 65 and transistor N55 having its conduction path connected between conductor 24 and terminal 65. The gates of transistors N53 and N55 are connected to conductors 22 and 18, respectively.

In response to the clock signal Q there is produced at terminals 18 and 20 the signals A and B, respectively. And, in response to the clock signal $\overline{Q}$ thus is produced at terminals 22 and 24, the signals $\overline{A}$ and $\overline{B}$, respectively. The signals A, B, $\overline{A}$ and $\overline{B}$ are shown in FIG. 2.

When B is at $-V$ volts the signal $\overline{A}$ on conductor 22 is at +V volts. Transistor N53 with its gate at +V volts is fully turned on and couples $-V$ volts from conductor 20 to terminal 65. During this time interval $\overline{B}$ is at zero volts, the signal A on conductor 18 is at $-V$ volts, and transistor N55 is turned off.

When $\overline{B}$ is at $-V$ volts (B is at zero volts) the signal A on conductor 18 is at +V volts. Transistor N55 is turned fully on and couples, through its conduction path, $-V$ volts to terminal 65. During this time interval, B is at zero volts, $\overline{A}$ is at $-V$ volts, and transistor N53 is turned off. Clearly during one time interval transistor N53 couples $-V$ volts to terminal 65 and during the subsequent time interval transistor N55 couples $-V$ volts to terminal 65. There is, therefore, produced at terminal 65 a negative direct current level of $-V$ volts. Consequently, the available d.c. potential between terminals 10 and 65 is equal to 2V volts.

Figure 7:
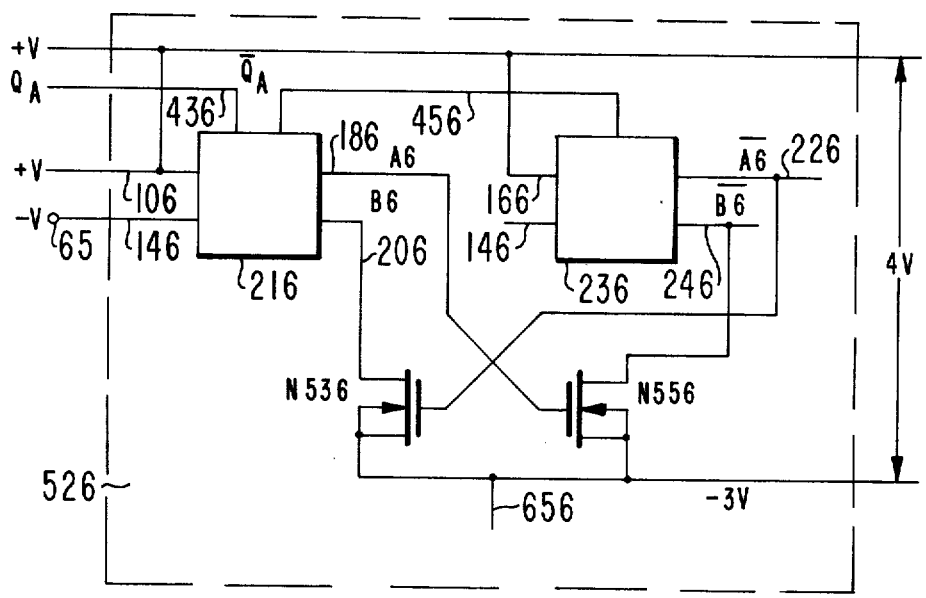

The circuit of FIG. 6 may be cascaded with like circuits as shown in FIG. 7 to produce ever increasing direct current (d.c.) potentials. In FIG. 7, the number 6 has been appended to the reference numerals denoting those components in FIG. 7 corresponding to like components in FIG. 6. The voltages applied to terminals 106 and 146 are +V volts and $-V$ volts respectively instead of +V volts and ground as in FIG. 6. The clock signal ($Q_A$) applied to terminal 436 should have an amplitude corresponding to the signal A as shown in FIG. 2 and present on conductor 18. That is, the clock signal ($Q_A$) amplitude must swing between +V volts and −V volts. This is analogous to the circuit of FIG. 6 where the clock signal Q switches between +V volts and ground when the range of the operating potential was between +V volts and ground. The signal $\overline{Q_A}$ may be obtained from the circuitry in box 216 or could instead be the signal $\overline{A}$ produced by the circuitry in box 52 of FIG. 6.

The voltage output (+V and −V) of one voltage doubler (52) may be used as the power supply for a second voltage doubler (526). The voltage output (+V and −3V) of the second voltage doubler may, similarly, be used as the power supply for a third voltage doubler (not shown). In addition, the clock pulses ($Q_A$) to operate a subsequent voltage may be obtained from the pulsating signal (A) produced by the preceding voltage doubler or from independent control pulses.

Evidently, as already noted, the circuits of FIGS. 6 and 7 illustrate that the power supply potential to a doubler can be doubled and that the output of one doubler can be used as the power supply for a subsequent doubler. Cascading of voltage doublers permits the amplitude of a given source of potential to be quickly and easily increased.

Figure 8:
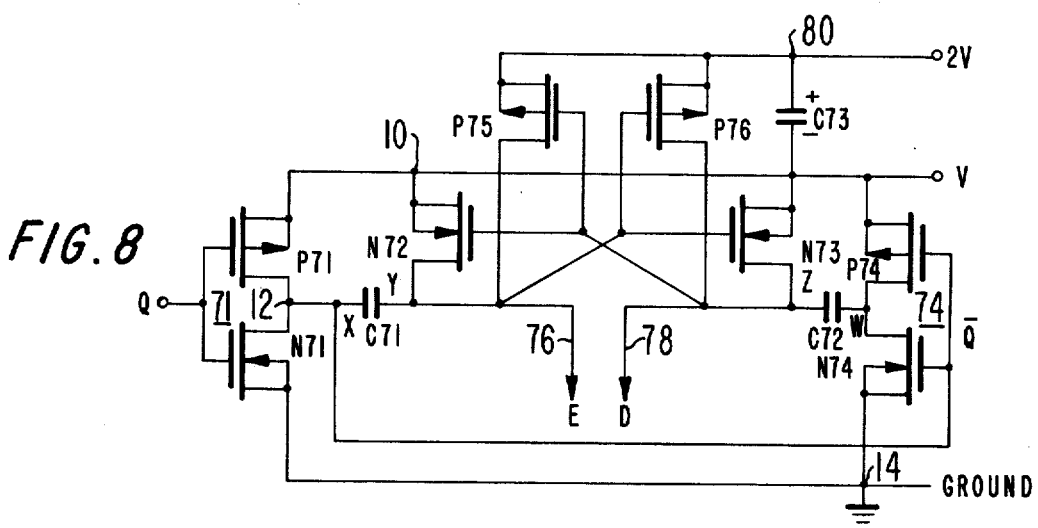
FIG. 8 is a schematic diagram of another circuit embodying the invention.

The circuit of FIG. 8 may be used to produce pulsating signals and a d.c. voltage having an amplitude which is more positive than that of the power supply (+V and ground) connected to the circuit.

The circuit includes complementary inverter 71 comprised of transistors P71 and N71 and complementary inverter 74 comprised of transistors P74 and N74. Transistors P71 and P74 are connected at their sources and substrates to conductor 10 to which is applied +V volts. Transistors N71 and N74 are connected at their sources and substrates to ground conductor 14. The drains of transistors P71 and N71 are connected to output terminal 12 which is connected to plate X of capacitor C71 and to the gates of transistors P74 and N74. In response to a signal Q applied to the input gates of transistors P71 and N71 of inverter 71, complementary signal $\overline{Q}$ is produced at terminal 12 which is applied to the input of inverter 74. Inverter 74 is connected at its output to plate W of capacitor C72. Transistor N72 has its source-drain path connected between conductor 10 and plate Y of capacitor C71 to which is also connected the gate of transistor N73. Transistor N73 has its source-drain path connected between conductor 10 and plate Z of capacitor C72 to which is also connected the gate of transistor N72. Conductor 76 coupled to plate Y and conductor 78 coupled to plate Z carry pulsating signals identified in FIG. 9 as E and D, respectively.

The pulsating signals may be converted into a d.c. signal by means of cross-coupled transistors P75 and P76. Transistors P75 and P76 have their source drain paths connected between conductor 80 and plates Y and Z, respectively. The gates of transistor P75 and P76 are connected to plates Z and Y respectively. A d.c. potential of +2V volts is produced on conductor 80. A capacitor C73 may be connected between conductors 80 and 10 to smooth out switching spikes.

Figure 9:
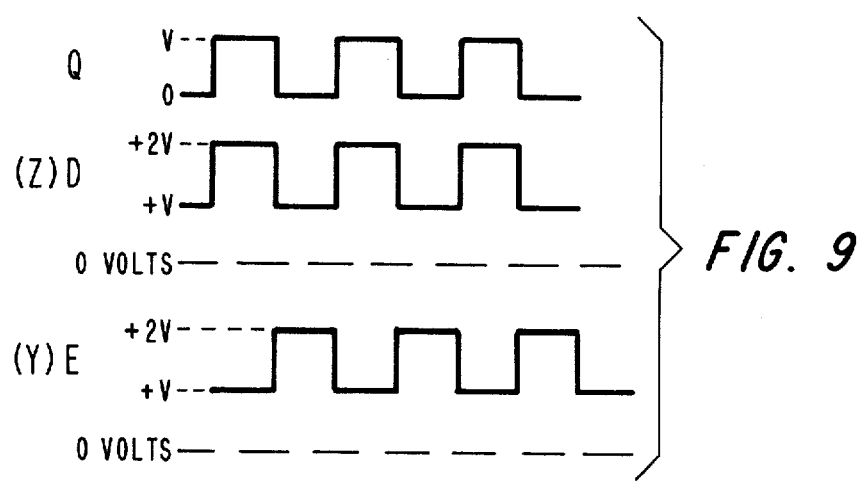
FIG. 9 is a diagram of waveforms associated with the circuit of FIG. 8.

When, as shown in FIG. 9, Q goes to +V volts (high) transistor N71 turns on and $\overline{Q}$ goes to zero volts (low). $\overline{Q}$ low turns on transistor P74 and the potential at terminal W of C72 goes from zero volts to +V volts. It may be assumed that the potential at Z was initially at, or close to, +V volts. Since the potential across a capacitor cannot change instantaneously, a positive going signal which goes from +V volts to +2V volts is generated at plate Z. This potential is applied to the gate of transistor N72, turning it on to clamp plate Y of C71 to +V volts. When Q goes negative transistor N71 is turned off and transistor P71 is turned on. The turn on of transistor P71 causes the potential at plate X of C71 to go towards +V volts. The potential at X ($\overline{Q}$) is applied to the gates of transistors P74 and N74 turning off the former and turning on the latter.

When transistor N74 is turned on the potential at W goes from +V volts to zero volts and the potential at Z goes from +2V volts to +V volts. +V volts applied to the gate of transistor N72 turns it off since its source and substrate are also at +V volts. Concurrently, the positive going voltage step of zero to +V volts applied to X passes through capacitor C71 and the potential at Y goes from +V volts to +2V volts. +2V volts is applied to the gate of N73 turning it on and clamping plate Z to +V volts. There is, therefore, produced on conductors 76 and 78 signals E and D, respectively, as shown in FIG. 9, which vary in amplitude from +V volts to +2V volts.

When power is initially applied to the circuit of FIG. 8 the substrates of transistors N72 and N73 are connected to conductor 10 to which is applied +V volts. The diffused regions of transistors N72, N73 connected to initially uncharged plates Y and Z, respectively, form forward biased diodes with their substrates. These diodes pass a current which causes plates Z and/or Y to be charged initially to a potential close to +V volts, (actually the voltage will be approximately equal to +V volts minus one $V_{BE}$ drop). This ensures the switching action of the circuit and the production of pulsating signals as soon as the control pulses Q are applied. Once pulsating signals are applied, the diffused regions connected to terminals Y and Z do not go more negative than +V volts and the diode action no longer occurs and is no longer necessary.

The pulsating signals E and D are converted into a d.c. level of +2V volts by means of transistors P75 and P76.

When the signal D is at +2V volts and the signal E is at +V volts, transistor P76 has +2V volts applied to one end of its conduction path and +V volts applied to its gate. Transistor P76 conducts causing conductor 80 to charge up to +2V volts. Concurrently, transistor P75 with +2V volts applied to its gate remains cut off.

When the signal D is at +V volts the signal E is at +2V volts. Transistor P75 has +2V volts applied to one end of its conduction path and +V volts applied to its gate. Transistor P75 conducts causing conductor 80 to charge up to +2V volts. Concurrently transistor P76 with +2V volts on its gate remains cut off. Capacitor C73 connected between conductors 80 and 10 functions to smooth out any switching spikes appearing on conductor 80. The circuit of FIG. 8 thus generates a pulsating potential D or E outside the range of the power supply voltage and also produces a d.c. voltage +2V of greater magnitude than the power supply voltage.

In the circuit of FIG. 8 transistor N72 and N73 are operated in the source follower mode when they charge plates Y and Z, respectively to +V volts. But, when these transistors are operated in the source follower mode their gates are overdriven to 2V volts. Consequently, these transistors can clamp the potential at plates Y and Z of capacitors C71 and C72 to the full +V volts present on conductor 10. As a result, the potential at plates Y and Z can swing from +V volts to +2V volts.

The circuits described herein may be used in countless applications. Many circuits operate better at higher potentials. It is, therefore, advantageous to employ a higher operating potential or higher amplitude signals with the circuits than is available from the power supply. The speed of operation, the drive capability and the output voltage swing of many circuits such as complementary metal oxide semiconductor circuits depend on the magnitude of the gate drive signals and the operating potential.

In some critical applications such as in the counter stages connected to a high frequency oscillator it is often necessary to have a high operating potential for proper operation of the counting circuits.

Increasing the amplitude of the voltage available from a power supply extends the end of battery life. The end of battery life may be defined as the voltage at which the highest frequency counter stage can no longer operate at the required speeds. Increasing the power supply voltage as shown herein and then applying the increased voltage as shown in the FIGURES enables a higher potential to be applied to the counting circuits. This enables the battery voltage to go to a much lower value before the counter circuits are no longer operational.

Also many display or output devices require a much higher operating potential than necessary to drive digital or analog circuits. The circuits described above are highly suited to take a low power supply or battery voltage and increase it many times.

What is claimed is:

1. The combination comprising:
    a capacitor;
    first, second, third and fourth transistors; each transistor having first and second electrodes defining the ends of a conduction path and a control electrode;
    means connecting the conduction path of said first transistor between one side of said capacitor and a first terminal adapted to receive a first potential;
    means connecting the conduction path of said second transistor between said one side of said capacitor and a second terminal adapted to receive a second potential other than said first potential;
    means connecting the conduction path of said third transistor between the other side of said capacitor and said second terminal;
    means connecting the conduction path of said fourth transistor between said other side of said capacitor and the control electrode of said third transistor; and
    means connected to the control electrodes of said first, second, third, and fourth transistor for turning on said first and third transistors, and turning off said second and fourth transistors during a first time interval, and for turning off said first and third transistors and turning on said second and fourth transistors during a second time interval.

2. The combination as claimed in claim 1, wherein said means for turning on said third transistor includes a fifth transistor having its conduction path connected between the control electrode of said third transistor and a potential point adapted to receive a potential different in value than that applied to said second terminal, and means connected to the control electrode of said fifth transistor for turning it on and providing a turn on signal to said third transistor when said first transistor is turned on and for turning off said fifth transistor when said second and fourth transistors are turned on.

3. The combination as claimed in claim 2 wherein said first and fifth transistors are of one conductivity type; and wherein said second, third, and fourth transistors are of different conductivity type.

4. The combination as claimed in claim 3 wherein each one of said transistors is operated in the common source mode when conducting.

5. The combination as claimed in claim 3 wherein said transistors are insulated-gate field-effect transistors (IGFETS) wherein said first and second electrodes of each one of said transistors define the ends of a conduction channel formed over a substrate region; and
    wherein the substrate regions of said third and fourth transistors are connected to said second side of said capacitor.

6. The combination as claimed in claim 3 wherein said other side of said capacitor is connected to a first output line at which are produced signals outside the range of the potentials applied to said first and second terminals; and
    wherein the ends of the conduction paths of said fourth and fifth transistors connected to the control electrode of said third transistor are connected to a second output line at which are produced signals of greater amplitude than the magnitude of the potential applied between said first and second terminals.

7. The combination as claimed in claim 6 wherein said first terminal and said potential point are connected in common and wherein said first potential applied to the common connection is a first, fixed, operating potential; and
    wherein said second potential is a second, fixed, operating potential.

8. The combination as claimed in claim 3 further including a sixth transistor having its conduction path connected between said first terminal and said one side of said capacitor and having its control electrode connected to the control electrode of said third transistor.

9. The combination as claimed in claim 3 further including:
    an output point at which are selectively produced signals of one or another value;
    first means for coupling the potential at said one side of said capacitor to said output point;
    second means for coupling the potential at said other side of said capacitor to said output point; and
    means coupled to said first and second means for selectively enabling one or the other of said first and second means and disabling the other one of said first and second means.

10. The combination as claimed in claim 9 wherein said second means includes a transistor having its conduction path connected between said other side of said capacitor and said output point;
    wherein said first means includes a transistor having its conduction path connected between said one side of said capacitor and said output point; and
    wherein said means coupled to said first and second means includes a complementary inverter having a control input and a control output, said control input being connected to the control electrode of said transistor of said second means and said control output being connected to the control electrode of said transistor of said first means.

11. The combination as claimed in claim 10 wherein said complementary inverter includes two transistors having their conduction paths connected in series between said point of potential and said output point.

12. A circuit for producing complementary signals of greater amplitude than the operating potential applied between the first and second power terminals of the circuit, comprising:

first and second means, each having: (1) a capacitor; (2) a first switch means connected between one side of said capacitor and the first power terminal; (3) a second switch means connected between said one side of said capacitor and the second power terminal; (4) one transistor having its conduction path connected between the other side of said capacitor and the second power terminal; (5) a second transistor having its conduction path connected between the other side of said capacitor and one output terminal to which the control electrode of said one transistor is connected; and (6) a third transistor having its conduction path connected between said output terminal and the first power terminal; and means connected to said first and second means for turning on the first switch means and the one and third transistors of the first means, and the second switch means and the second transistor of the second means during one time interval and for turning on the first switch means and the one and third transistors of the second means, and the second switch means and the second transistor of the first means during a subsequent time interval for producing a signal at the output terminal of the first means which is out of phase with respect to the signal produced at the output terminal of the second means.

13. The combination as claimed in claim 12 further including first and second additional transistors and an additional output point;

wherein the conduction path of said first additional transistor is connected between the other side of the capacitor of said first means and said additional output point;

wherein the conduction path of said second additional transistor is connected between the other side of the capacitor of said second means and said additional output point;

wherein the control electrode of said first additional transistor is connected to the output terminal of said second means; and wherein the control electrode of said second additional transistor is connected to the output terminal of said first means.

14. The combination comprising:

first and second means; each having a first and a second power terminal for the application therebetween of an operating potential, a control input terminal for the application thereto of a control signal of varying amplitude, a first output terminal for producing thereat a signal outside the range of said operating potential in response to said control signal, and a second output terminal for producing thereat a signal of greater amplitude than said operating potential in response to said control signal;

means for applying complementary signals to the control terminals of said first and second means;

first and second transistors, each transistor having first and second electrodes defining the ends of a conduction path and a control electrode;

an output point;

means connecting the conduction path of said first transistor between the first output terminal of said first means and said output point;

means connecting the conduction path of said second transistor between said first terminal of said second means and said output point;

means connecting the control electrode of said first transistor to the second output terminal of said second means; and means connecting the control electrode of said second transistor to the second output terminal of said first means.

15. The combination as claimed in claim 14 wherein a first voltage ($V_1$) is applied to said first power terminal and a second voltage ($V_2$) is applied to said second power terminal; the magnitude of the operating potential being the difference between $V_1$ and $V_2$;

wherein the amplitude of the signal produced at said first output terminal is approximately equal to the magnitude of said operating potential and whose level is outside the range defined by $V_1$ and $V_2$; and wherein the amplitude of the signal produced at said second output terminal is approximately equal to twice the magnitude of said operating potential.

16. The combination as claimed in claim 14 wherein each one of said first and second means includes five transistors and a capacitor; two of said five transistors for clamping one plate of said capacitor to said first or second power terminal, the other plate of said capacitor being connected to the first output terminal of the means, a third one of said five transistors for selectively clamping said other plate to one of said first and second power terminals, a fourth one of said five transistors for selectively coupling said first output terminal to said second output terminal and for turning off said third one of said five transistors; and the fifth one of said five transistors for selectively applying to said second output terminal of the means the potential at said first and second power terminals other than the one applied at said other plate by said third one of said five transistors.

17. The combination comprising:

a capacitor;

first, second, and third transistors; each transistor having first and second electrodes defining the ends of a conduction path and a control electrode;

means connecting the conduction path of said first transistor between one plate of said capacitor, and a first terminal adapted to receive a first potential;

means connecting the conduction path of said second transistor between said one plate of said capacitor and a second terminal adapted to receive a second potential other than said first potential;

means connecting the conduction path of said third transistor between the other plate of said capacitor and said second terminal; and means connected to the control electrodes of said first, second, and third transistors for turning on said first transistor, overdriving said third transistor into conduction and turning off said second transistor during a first time interval, and for turning off said first and third transistors and turning on said second transistor during a second time interval; said first and third transistors coupling substantially the full potential at said first and second terminals to the one and other plates, respectively, of said capacitor, when turned on; and said second transistor coupling substantially the full potential at said second terminal to the one plate of said capacitor when turned on.

18. The combination as claimed in claim 17 wherein said means connected to the control electrode of said third transistor includes an inverter and a second capacitor; said second capacitor being connected between the output of said inverter and the control electrode of said third transistor; and wherein the signal applied to the input of said inverter is the complement of the signal applied to the control electrodes of said first and second transistors.

19. The combination comprising:
first and second inverters each having a signal input and a signal output and two power terminals for the application therebetween of an operating potential;
first and second capacitors;
first and second transistors, each transistor having first and second electrodes defining the ends of a conduction path and a control electrode;
means connecting said first capacitor between the output of said first inverter and one end of the conduction path of said first transistor;
means connecting said second capacitor between the output of said second inverter and one end of the conduction path of said second transistor;
means connecting the other ends of the conduction paths of said first and second transistors to one of the two power terminals of said first and second inverters;
means connecting the control electrode of said first transistor to said one end of the conduction path of said second transistor; and
means connecting the control electrode of said second transistor to said one end of the conduction path of said first transistor.

20. The combination as claimed in claim 19 further including third and fourth transistors; each having first and second electrodes defining the ends of a conduction path and a control electrode;
an output terminal for producing a direct current level;
means connecting the conduction path of said third transistor between said one end of the conduction path of said first transistor and said output terminal;
means connecting the conduction path of said fourth transistor between said one end of the conduction path of said second transistor and said output terminal;
means connecting the control electrode of said third transistor to the control electrode of said first transistor; and
means connecting the control electrode of said fourth transistor to the control electrode of said second transistor.

21. The combination as claimed in claim 20 wherein said first and second transistors are of one conductivity type and wherein said third and fourth transistors are of opposite conductivity type.

22. The combination as claimed in claim 21 wherein said first and second inverters are complementary inverters, wherein the signal applied to the input of the second inverter is the complement of the signal applied to the input of the first inverter.

* * * * *